(12) United States Patent
Zhang et al.

(10) Patent No.: US 10,166,723 B2
(45) Date of Patent: Jan. 1, 2019

(54) METHOD OF EDGE SEALING FOR SECONDARY LITHIUM BATTERY

(71) Applicant: NINGDE AMPEREX TECHNOLOGY LIMITED, Ningde, Fujian Province (CN)

(72) Inventors: Yajie Zhang, Ningde (CN); Ping He, Ningde (CN); Liqing Lin, Ningde (CN); Jiali Dong, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 0 days.

(21) Appl. No.: 15/299,089

(22) Filed: Oct. 20, 2016

(65) Prior Publication Data
US 2017/0297269 A1  Oct. 19, 2017

(30) Foreign Application Priority Data

Apr. 19, 2016  (CN) .......................... 2016 1 0244262

(51) Int. Cl.
*B29C 65/52* (2006.01)
*B29C 65/48* (2006.01)
(Continued)

(52) U.S. Cl.
CPC ........ *B29C 65/526* (2013.01); *B29C 65/4805* (2013.01); *B29C 67/0059* (2013.01);
(Continued)

(58) Field of Classification Search
CPC ............. B29C 65/4805; B29C 65/526; B29C 67/0059; B33Y 80/00; B33Y 10/00;
(Continued)

(56) References Cited

U.S. PATENT DOCUMENTS

| 2002/0155349 A1 | 10/2002 | Cheiky |
| 2014/0017556 A1 | 1/2014 | Lianghai |
| 2015/0255633 A1* | 9/2015 | Sukata ................. H01L 31/048 136/256 |

FOREIGN PATENT DOCUMENTS

| CN | 201862534 U | 6/2011 |
| CN | 202134624 U | 2/2012 |

(Continued)

OTHER PUBLICATIONS

Office Action from corresponding Chinese Patent Application No. 201610244262.1, dated Jan. 2, 2018.
(Continued)

*Primary Examiner* — Michael N Orlando
*Assistant Examiner* — Marta S Dulko
(74) *Attorney, Agent, or Firm* — Tucker Ellis LLP (57) ABSTRACT

A method of edge sealing for a secondary lithium battery, including: (1) drawing a 3D model of a battery edge of a secondary lithium battery, and inputting it into a 3D printer; (2) positioning the secondary lithium battery in a 3D printing area, and fixing a relative position of the secondary lithium battery in the 3D printing area; (3) stimulating, by the 3D printer, the battery edge according to the 3D model and setting a printing path; (4) adding edge sealing glue in a printing head of the 3D printer, the printing head moves according to the set printing path and meantime performs at least one time of printing, so that printed edge sealing glue covers the battery edge; (5) solidifying the edge sealing glue. The method of edge sealing of this application has broader application, which can be applied to batteries of any shape.

11 Claims, 5 Drawing Sheets

(51) Int. Cl.
  *B33Y 10/00* (2015.01)
  *B33Y 80/00* (2015.01)
  *H01M 10/0525* (2010.01)
  *H01M 10/058* (2010.01)
  *H01M 2/08* (2006.01)
  *H01M 2/04* (2006.01)
  *B29C 67/00* (2017.01)
  *B29K 105/00* (2006.01)
  *B29K 33/00* (2006.01)
  *B29L 31/00* (2006.01)

(52) U.S. Cl.
  CPC .............. *B33Y 10/00* (2014.12); *B33Y 80/00* (2014.12); *H01M 2/0434* (2013.01); *H01M 2/08* (2013.01); *H01M 10/058* (2013.01); *H01M 10/0525* (2013.01); *B29K 2033/00* (2013.01); *B29K 2105/0097* (2013.01); *B29L 2031/7146* (2013.01)

(58) Field of Classification Search
  CPC .. H01M 2/08; H01M 2/0434; H01M 10/0525; H01M 10/058
  See application file for complete search history.

(56) References Cited

FOREIGN PATENT DOCUMENTS

| | | |
|---|---|---|
| CN | 105342070 A | 2/2016 |
| EP | 2535961 A1 | 12/2012 |
| EP | 2685517 A1 | 1/2014 |
| JP | H7-124653 A | 5/1996 |
| JP | 3183341 U | 5/2013 |

OTHER PUBLICATIONS

Office Action from corresponding European Patent Application No. 16196263.4, dated Feb. 23, 2017.

Ambrosi, Adriano et al., "3D-Printing Technologies for Electrochemical Applications", Chemical Society Reviews, vol. 45, No. 10, Apr. 6, 2016, pp. 2740-2755.

Office Action from corresponding Japanese Patent Application No. 2016-221837, dated Oct. 12, 2017.

* cited by examiner

METHOD OF EDGE SEALING FOR SECONDARY LITHIUM BATTERY

CROSS-REFERENCE TO RELATED APPLICATIONS

The present application claims priority to Chinese Patent Application No. 201610244262.1, filed on Apr. 19, 2016, the content of which is incorporated herein by reference in its entirety.

TECHNICAL FIELD

The present application relates to the field of manufacturing technologies of secondary lithium battery and, particularly, relates to a method of edge sealing for a secondary lithium battery.

BACKGROUND

After the bare cell of a secondary lithium battery is covered up and down by two outer packages, there will exist a quite thin layer of aluminum on the covered interface, which will result in a risk of short circuit of the electrical component if the aluminum layer is exposed, and the edge sealing process is to cover the aluminum layer with an adhesive tape or glue, so as to prevent exposure of aluminum. While the conventional single edge folding and double edge folding are both applied to the rectangular battery with a regular shape.

The single edge folding process refers to that the glue is sprayed on the section from which aluminum is exposed by a spray gun controlling the amount of glue sprayed, then a single time of edge folding is performed. Or firstly performing edge folding and then sealing the section from which aluminum is exposed after the edge folding with an adhesive tape. The double edge folding process refers to that two times of edge folding are performed to cover the section from which aluminum is exposed in the area of the second time of edge folding, so as to achieve the objective of edge sealing. However, the existing single edge folding process and the double edge folding process are both limited to the rectangular battery with a regular shape, the device only needs to position the cell, coat glue and fold the edge. When the battery is an irregular or complex structure, the device will be unable to move along the edge of the outer package in a straight line due to the design problem, and the glue or adhesive tape will be unable to completely cover the section, which may cause the risk of exposing aluminum. Therefore, the conventional solution cannot be applied to the battery cell with an irregular shape. In view of the above, the present application is provided.

SUMMARY

The present application aims to provide an apparatus of edge sealing for a secondary lithium battery and a method thereof, which combines glue sealing and 3D printing and solves the bottleneck of irregular edge sealing difficulties.

Technical solutions of the present application are as follows:

A method of edge sealing for a secondary lithium battery, including steps of:

(1) drawing a 3D model of a battery edge to be edge sealed of a secondary lithium battery, and inputting the 3D model into a 3D printer;

(2) positioning the secondary lithium battery to be edge sealed in a 3D printing area, and fixing a relative position of the secondary lithium battery in the 3D printing area;

(3) stimulating, by the 3D printer, the battery edge according to the 3D model and setting up a printing path;

(4) adding edge sealing glue in a printing head of the 3D printer, the printing head moves according to the set printing path and in the meantime performs at least one time of printing, so that printed edge sealing glue covers the battery edge;

(5) solidifying the edge sealing glue.

Preferably, step (1) further includes setting up a printing width according to a size of the battery edge.

Preferably, before positioning the secondary lithium battery to be edge sealed in the 3D printing area, the method further includes shaping and edge trimming the battery edge of the secondary lithium battery.

Preferably, in step (4), the printing head includes a pair of symmetrically arranged gluing injectors provided with gluing needles, when printing, the gluing needles of the pair of gluing injectors are respectively located close to two sides of the battery edge, and simultaneously move along the printing path with a same moving rate and a same glue extruding rate, and print glue of a uniform volume on the two sides of the battery edge.

Preferably, the moving rate of the gluing needles is 5~100 mm/s; the glue extruding rate is 0.2~4 mm$^3$/s.

Preferably, a viscosity of the edge sealing glue is 200 mPa·s~400 mPa·s.

Preferably, the edge sealing glue is light solidifying glue or heat solidifying glue; the light solidifying glue is preferably UV light solidifying glue, further preferably acrylic resin adhesive; the heat solidifying glue is preferably acrylic adhesive.

Preferably, a solidifying condition of the light solidifying glue is solidifying for 5~10 seconds under ultraviolet light of 100~500 cd; a solidifying condition of the heat solidifying glue is solidifying for 12~20 minutes at 160° C.~180° C.

Preferably, after accomplishing step (5), the method further includes coating edge folding glue on the battery edge coated with solidified edge sealing glue, and performing single edge folding when the edge folding glue is half solidified, then fully solidifying the edge folding glue.

Preferably, the edge folding glue is anaerobic glue, preferably tetraethylene glycol dimethacrylate anaerobic glue or hydroxyethyl methylacrylate anaerobic glue.

The technical solutions provided by the present application can achieve the following beneficial effect:

The method of edge sealing of the present allocation, compared to the conventional manner of gluing an adhesive tape, has broader application, which can apply to batteries of any shape and any mode. Process development difficulty and equipment cost are greatly reduced, that is, only changing a built-in model can change the moving trajectory with a high stability of the equipment, which makes the edge sealing of batteries with irregular edges in large quantities become a reality.

REFERENCE SIGNS

1—secondary lithium battery;
11—negative electrode tab;
12—positive electrode tab;
13—battery edge;
2—fixture;
21—sucker;
3—printing head;
31—gluing injector;
32—gluing needle;
33—edge sealing glue;
4—edge folding glue.

DESCRIPTION OF EMBODIMENTS

In order to make the objectives, technical solutions and advantages of the present application more clear, the technical solutions of the present application will be clearly and completely described combining the embodiments and accompanying drawings of the present application, obviously, the embodiments described are merely a part of the embodiments of the present application, but not all of the embodiments. Based on the technical solutions and the embodiments provided by the present application, all other embodiments obtained by persons skilled in the art without any creative efforts shall belong to the protection scope of the present application.

The expressions "front", "back", "left", "right", "top" and "bottom" mentioned in the disclosure are all referring to the placement states of the battery in the drawings.

The method of edge sealing for a secondary lithium battery in the present application mainly including the following steps:

(1) drawing a 3D model of a battery edge 13 to be edge sealed of a secondary lithium battery 1, and inputting the 3D model into a 3D printer;

(2) positioning the secondary lithium battery 1 to be edge sealed in a 3D printing area, fixing a relative position of the secondary lithium battery 1 in the 3D printing area;

(3) stimulating, by the 3D printer, the battery edge 13 according to the 3D model and setting a printing path;

(4) adding edge sealing glue 33 in a printing head 3 of the 3D printer, the printing head 3 moves according to the set printing path and in the meantime performs at least one time of printing, so that printed edge sealing glue 33 covers the battery edge 13;

(5) solidifying the edge sealing glue 33.

In the above solution, by combining the edge gluing glue 33 and 3D printing, the 3D printer can stimulate the shape of the secondary lithium battery 1 and make a fitted glue layer with the edge sealing glue of a specific viscosity, so as to guarantee that the edge of the secondary lithium battery 1 with an irregular shape is covered by the glue, thereby achieving edge sealing and preventing aluminum exposure.

Figure 1:
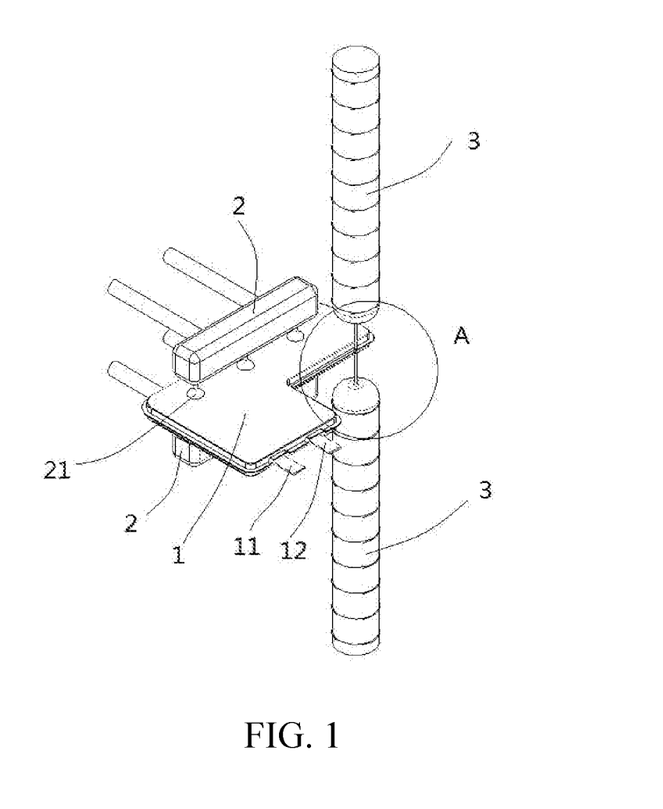
FIG. 1 is a perspective view of an assembling relationship of a secondary lithium battery, a fixture and a printing head in a method of edge sealing for a secondary lithium battery according to an embodiment of the present application.
Figure 3:
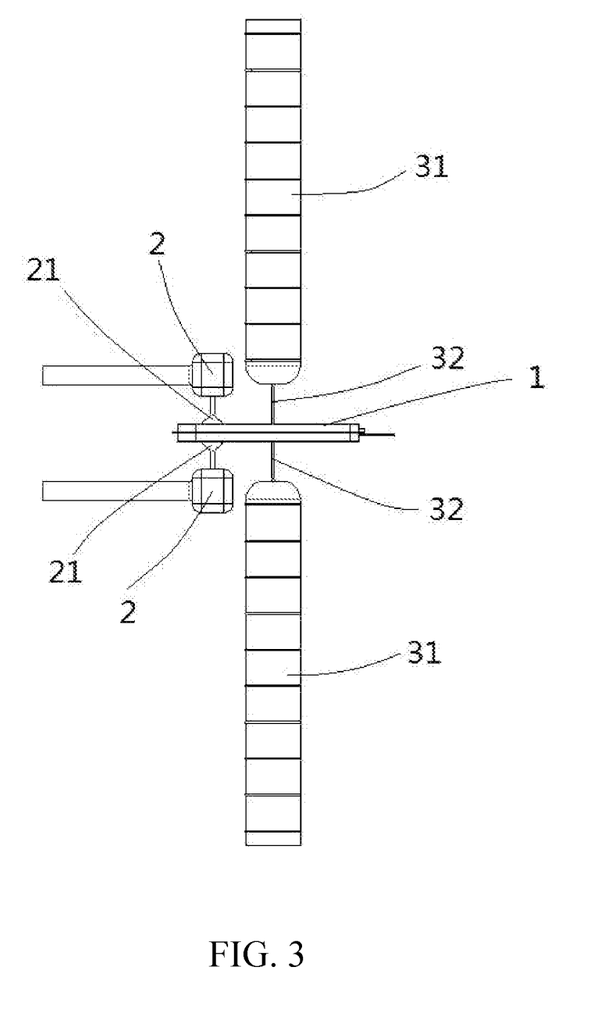
FIG. 3 is a side view of the assembling relationship of the secondary lithium battery, the fixture and the printing head in the method of edge sealing for the secondary lithium battery according to an embodiment of the present application.

Devices involved in the above method of edge sealing mainly includes: a positioning and fixing apparatus, a 3D printer, a printing head 3 of the 3D printer (gluing structure), and a secondary lithium battery 1 (including a positive electrode tab 12, a negative electrode tab 11 and a battery edge 13) packaged with a packaging bag, as shown in FIG. 1 and FIG. 3.

In Step (1), a corresponding 3D model is drawn according to the size of the battery edge 13. Usually, a 3D drawing software is selected to draw the 3D model of the battery edge 13 and stimulate the edge of the outer package of the secondary lithium battery 1. The 3D drawing software can be any drawing software, such as SolidWorks, ProE, Auto CAD, CATIA and so on.

Preferably, Step (1) further includes designing a suitable printing width according to the size of the battery edge 13.

A needle with a suitable internal diameter is selected according to the designed printing width, and the gluing width of a single time of printing varies according to the different internal diameters of the needles; when the printing width is over too wide, at least twice of multiple times of printing can be adopted, that is, re-gluing along the same path, so as to guarantee effective covering of the battery edge.

Taking the blue standard needle with an internal diameter of 0.41 mm as an example, gluing with a single time of printing is adopted when the printing width is less than 500 µm; and gluing with at least two times of printing is adopted when the printing width is more than 500 µm, meantime guaranteeing that the glue bodies of the multiple times of printing evenly connects with each other.

Preferably, before positioning the secondary lithium battery 1 to be edge sealed in the 3D printing area, performing shaping and edge trimming to the secondary lithium battery 1 to be edge sealed; according to the requirements on the size, cutting off excess aluminum plastic film sealing edge, of which the tolerance requirement can be appropriately adjusted according to requirements on the product; the manner of shaping and edge trimming can be cutting or punching.

Preferably, the shaping and edge trimming of the secondary lithium battery 1 should guarantee that the trimmed edge is complete with no burrs, no ups and downs.

In Step (2), a fixture 2 is adopted to fix and position the secondary lithium battery 1 in the 3D printing area.

Figure 2:
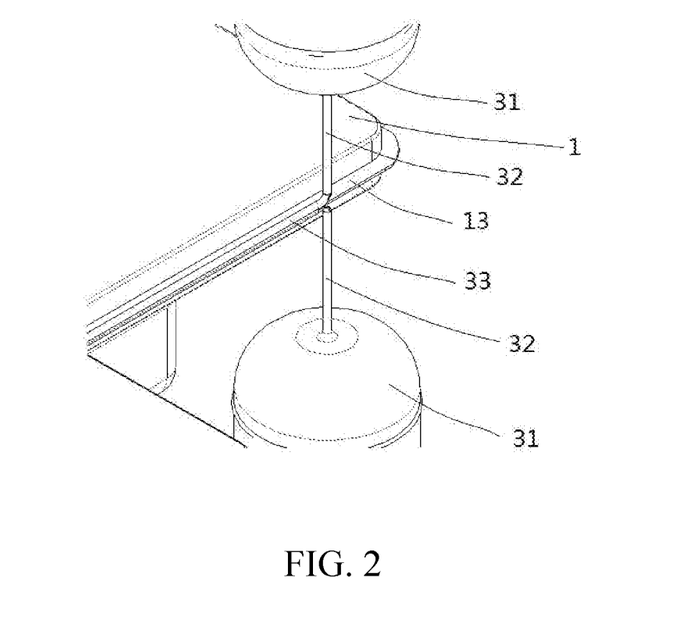
FIG. 2 is a partial enlarged view of section A in the method of edge sealing for a secondary lithium battery when the printing head is coating glue to a battery edge according to an embodiment of the present application.
Figure 4:
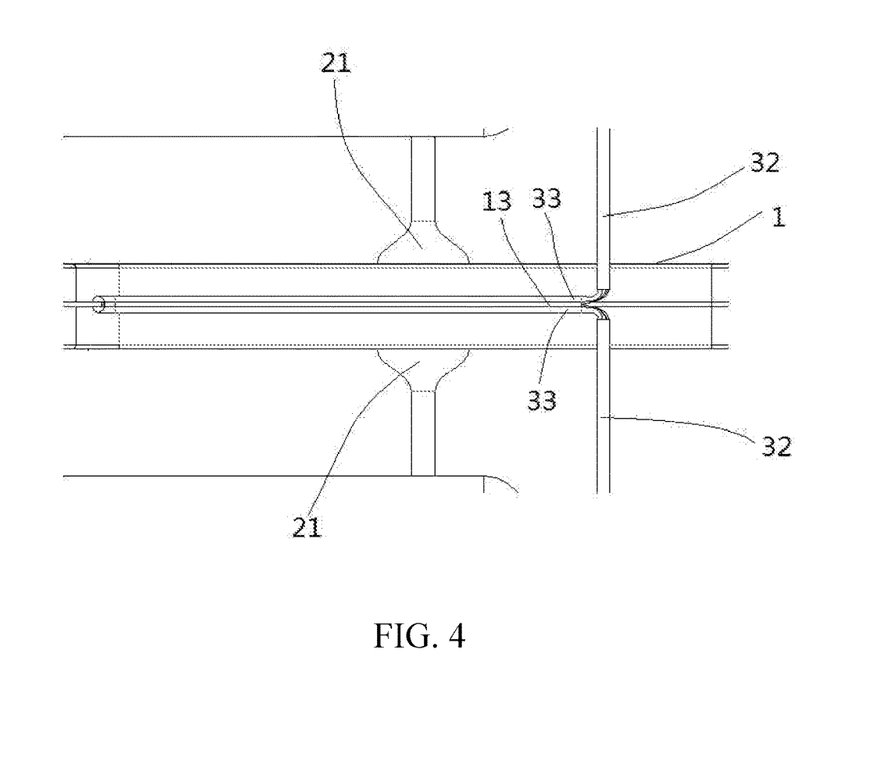
FIG. 4 is a partial enlarged side view of the assembling relationship of the secondary lithium battery, the fixture and the printing head in the method of edge sealing for the secondary lithium battery according to an embodiment of the present application.

Preferably, a fixture 2 that can provide vacuum pressure is adopted, as shown in FIG. 1, FIG. 2 and FIG. 4, including a vacuum controlling chamber and multiple suckers 21 connected with the vacuum controlling chamber. The fixture 2 is symmetrically arranged on the two sides of the large plane of the secondary lithium battery 1, of which the suckers 21 act on the large plane of the secondary lithium battery 1, the vacuum controlling chamber is evacuated to produce negative pressure, so that the secondary lithium battery 1 is absorbed and fixed by the suckers 21 on the two sides.

After positioning the secondary lithium battery 1 in the 3D printing area, the relative position of the secondary lithium battery 1 in the 3D printing area is fixed, and then the 3D printer can use a charge coupled device (Charge Coupled Device, CCD) to search for the outer profile of the battery edge 13 for path stimulation, or use a stored path program. Since the relative position of the secondary lithium battery 1 of the same shape in the 3D printing area is fixed, the outer profile in the 3D printing area is identical either, thus only the outer profile of the first secondary lithium battery 1 needs to be stimulated to set the path.

As an improvement of the present application, as shown in FIGS. 1-4, the printing head 3 includes a pair of gluing injectors 31 provided with gluing needles 32, the pair of gluing injectors 31 is symmetrically arranged (symmetrically arranged up and down in the drawings), when printing, the gluing needles 32 of the pair of gluing injectors 31 are respectively located close to the two sides of the battery edge 13; after the selected edge sealing glue 33 is injected into the gluing injectors 31, the two gluing injectors 32 are controlled by a motion controlling device of the 3D printer and are provided with specific stable pressure, so as to move along the printing path with a same moving rate and a same glue extruding rate, and coat the edge sealing glue 33 on the battery edge 13 from the gluing needles 32, so that glue of a uniform volume is left on the two sides of the battery edge 13, thereby covering the battery edge 13.

Preferably, the moving rate of the gluing needle 32 is 5~100 mm/s; the glue extruding rate is 0.2~4 mm³/s.

Preferably, the internal diameter of the gluing needle 32 is 0.21~1.43 mm.

As an improvement of the present application, the viscosity of the edge sealing glue 33 is 200 mPa·s~400 mPa·s. Glue with a too low viscosity will cause breakage of the liquid column, thus the glue is discontinuous, or a gap is formed after the liquid flows through the section thereby exposing the aluminum. Glue with a too high viscosity will cause decreasing of fluidity, thus the liquid cannot smoothly flow to the section and aluminum may be exposed in part of the section. In the meantime, for areas with narrow gluing slit, glue with a too high viscosity will cause the narrow slit to be completely blocked by the glue, resulting in potential risks in subsequent edge folding or applying.

As an improvement of the present application, the edge sealing glue 33 used in Step (4) is light solidifying glue or heat solidifying glue. The light solidifying glue or heat solidifying glue can be completely solidified with a fast forming speed once entering into an ultraviolet light environment or a heat environment. In the mass production process, the solidifying speed will affect the efficiency of producing the secondary lithium battery in a unit interval, while other forming manners, such as low-temperature solidifying, may cause breakage or melting of the glue in the edge folding process or the edge ironing process, thereby causing the section protection lose efficacy.

The light solidifying glue is preferred to be UV light solidifying glue, for example acrylic resin adhesive. The main components of acrylic resin adhesive are acrylic resin, isobornylacrylate, hydroxyethyl acrylate and silicon dioxide, etc.

Preferably, the heat solidifying glue is preferred to be acrylic adhesive.

Preferably, the solidifying condition of the light solidifying glue is solidifying for 5~10 seconds under ultraviolet light of 100~500 cd.

Preferably, the solidifying condition of the heat solidifying glue is solidifying for 12~20 minutes at 160° C.~180° C.

Figure 5:
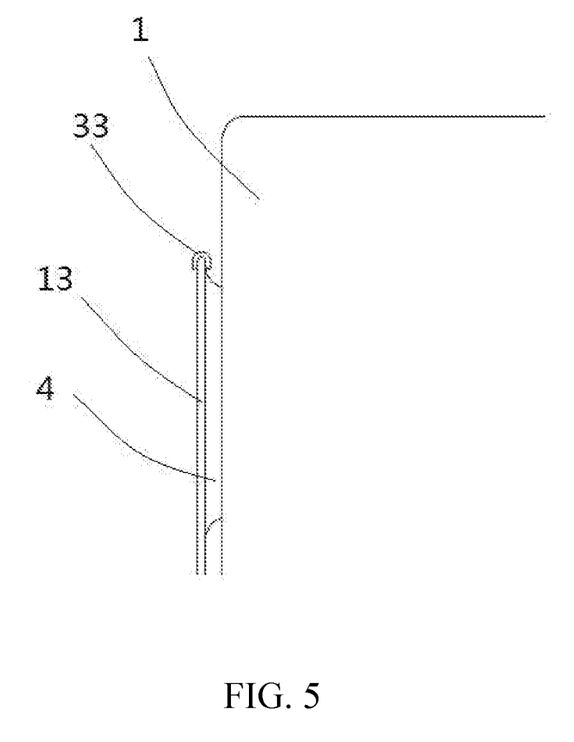
FIG. 5 is a schematic view of a section of the battery after single edge folding according to an embodiment of the present application.

As an improvement of the present application, the edge sealing process further includes a step of single edge folding: as shown in FIG. 5, coating edge folding glue 4 on the battery edge 13 coated with the solidified edge sealing glue 33, and performing single edge folding when the edge folding glue 4 is half solidified, then fully solidifying the edge folding glue 4, so that the glued edge after the single edge folding will not break.

Preferably, the edge folding glue 4 of the present application is anaerobic glue, including tetraethylene glycol dimethacrylate anaerobic glue, hydroxyethyl methylacrylate anaerobic glue, etc.

Embodiment 1

1. The secondary lithium battery 1 to be edge sealed packaged by a packaging bag is as shown in FIG. 1, of which the large plane is L shaped; the width of the battery edge 13 is 2.5 mm, the designed width of the battery edge 13 to be edge sealed is 0.4 mm; firstly, adopting a 3D drawing software to draw a 3D model of the battery edge 13 to be edge sealed, then inputting the 3D model into a 3D printer, and selecting a needle with the internal diameter of 0.41 mm as the gluing needle 32 of the printing head 3;

2. Trimming the edge with blades, cutting off excess aluminum plastic film sealing edge, so as to guarantee that the trimmed edge is complete with no burrs, no ups and downs;

3. Positioning the secondary lithium battery 1 after shaping and edge trimming in the 3D printing area by a fixture 2 with the large plane of the secondary lithium battery 1 being horizontally placed, so that the relative position of the secondary lithium battery 1 in the 3D printing area is fixed;

4. Stimulating, by the 3D printer, the battery edge 13 according to the aforementioned 3D model and setting the printing path;

5. Injecting the acrylic resin UV light solidifying glue with a viscosity of 374 mPa·s into the gluing injector 31; starting printing, during which gluing needles 32 of the pair of gluing injectors 31 are respectively located close to the two sides of the battery edge 13, the motion controlling device of the printer simultaneously controls the motion of the two gluing injectors 31 and provides the gluing injectors 31 with specific stable pressure, so that the gluing needles 32 of the two gluing injectors 31 simultaneously move along the trajectory of the battery edge 13 with a same moving rate at 100 mm/s and a same glue extruding rate at 4 mm³/s according to the aforementioned printing path, and coating the edge sealing glue 33 on the battery edge 13 from the gluing needles 32, so that glue of a uniform volume is left on the two sides of the battery edge 13 to form a sealed structure covering the battery edge 13;

6. Carrying, by the fixture 2, the edge sealed secondary lithium battery 1 and entering into a UV light environment for glue solidifying for 7 seconds, so as to achieve fully solidifying;

7. Coating hydroxyethyl methylacrylate anaerobic glue with good adhesive force on the aforementioned battery edge 13 coated with the solidified edge sealing glue 33, and performing a single edge folding process when the glue is half solidified, then fully solidifying the edge folding glue 33, so that the glued edge after the single edge folding will not break.

When performing edge sealing on a next secondary lithium battery with the same shape, it is only needed to put the secondary lithium battery 1 to be edge sealed in the fixture 2 and then positioned and fixed, so that the next secondary lithium battery 1 can be printed with glue according to the same printing path with that of the first secondary lithium battery 1. If the shape of the next secondary lithium battery 1 is different from that of the aforementioned secondary lithium battery 1, the above steps of the method of edge sealing should be repeated to print glue.

Embodiment 2

1. The secondary lithium battery 1 to be edge sealed packaged by a packaging bag is as shown in FIG. 1, of which the large plane is L shaped; the width of the battery edge 13 is 2.5 mm, the designed width of the battery edge 13 to be edge sealed is 0.4 mm; firstly, adopting a 3D drawing software to draw a 3D model of the battery edge 13 to be edge sealed, then inputting the 3D model into a 3D printer, and selecting a needle with the internal diameter of 0.41 mm as the gluing needle 32 of the printing head 3;

2. Trimming the edge with blades, cutting of excess aluminum plastic film sealing edge, so as to guarantee that the trimmed edge is complete with no burrs, no ups and downs;

3. Positioning the secondary lithium battery 1 after shaping and edge trimming in the 3D printing area by a fixture 2 with the large plane of the secondary lithium battery 1 being horizontally placed, so that the relative position of the secondary lithium battery 1 in the 3D printing area is fixed;

4. Stimulating, by the 3D printer, the battery edge 13 according to the aforementioned 3D model and setting the printing path;

5. Injecting the acrylic resin UV light solidifying glue with a viscosity of 374 mPa·s into the gluing injector 31; performing two times of repeated glue printing, during which the moving rate of the gluing injectors 31 is the same for each time of printing at 100 mm/s, and the glue extruding rate is also the same for each time of printing at 4 mm³/s, the injecting needles on the two sides of the battery edge 13 move simultaneously along the trajectory of the edge of a designed width and coat the edge sealing glue 33 on the width edge to be sealed from the injecting needles, so that glue of a uniform volume is formed on the two sides of the battery edge 13, and at the outermost side of the battery edge 13, the glue forms a sealed structure covering the trimmed section of the battery edge 13; and the two times of glue printing are overlapped, so as to cover the battery edge more effectively;

6. Carrying, by the fixture 2, the edge sealed secondary lithium battery 1 and entering into a UV light environment for glue solidifying for 7 seconds, so as to achieve fully solidifying;

7. Coating hydroxyethyl methylacrylate anaerobic glue with good adhesive force on the aforementioned battery edge 13 coated with the solidified edge sealing glue 33, and performing a single edge folding process when the glue is half solidified, then fully solidifying the edge folding glue 33, so that the glued edge after the single edge folding will not break.

When performing edge sealing on a next secondary lithium battery with the same shape, it is only needed to put the secondary lithium battery 1 to be edge sealed in the fixture 2 and then positioned and fixed, so that the next secondary lithium battery 1 can be printed with glue according to the same printing path with that of the first secondary lithium battery 1. If the shape of the next secondary lithium battery 1 is different from that of the aforementioned secondary lithium battery 1, the above steps of the method of edge sealing should be repeated to print glue.

The present application is disclosed with the preferred embodiments as above, which are not used to limit the claims; any person skilled in the art, within the conception of the present application, can make a variety of possible variations and modifications, therefore the protection scope of the present application shall be subjected to the scope defined by the claims of the present application.

What is claimed is:

1. A method of edge sealing for a secondary lithium battery, comprising steps of:
    a) prior to edge sealing, drawing a 3D model of a battery edge of a secondary lithium battery, and inputting the 3D model into a 3D printer;
    b) prior to edge sealing, positioning the secondary lithium battery in a 3D printing area, and fixing a relative position of the secondary lithium battery in the 3D printing area;
    c) stimulating, by the 3D printer, the battery edge according to the 3D model and setting a printing path;
    d) adding edge sealing glue in a printing head of the 3D printer, the printing head moves according to the set printing path and in the meantime performs at least one time of printing, so that printed edge sealing glue covers the battery edge;
    e) solidifying the edge sealing glue,
    wherein, after accomplishing step e), further comprises coating edge folding glue on the battery edge coated with the solidified edge sealing glue, and performing single edge folding when the edge folding glue is half solidified, then fully solidifying the edge folding glue,
    wherein, the edge folding glue is anaerobic glue, and
    wherein, the anaerobic glue is tetraethylene glycol dimethacrylate anaerobic glue or hydroxyethyl methylacrylate anaerobic glue.

2. The method of edge sealing according to claim 1, wherein, the step a) further comprises setting a printing width according to a size of the battery edge.

3. The method of edge sealing according to claim 1, wherein, before positioning the secondary lithium battery to be edge sealed in the 3D printing area, further comprises shaping and edge trimming the battery edge of the secondary lithium battery.

4. The method of edge sealing according to claim 1, wherein, in the step d), the printing head comprises a pair of symmetrically arranged gluing injectors provided with gluing needles, when printing, the gluing needles of the pair of gluing injectors are respectively located close to two sides of the battery edge, and simultaneously move along the printing path with a same moving rate and a same glue extruding rate, and print glue of a uniform volume on the two sides of the battery edge.

5. The method of edge sealing according to claim 4, wherein, the moving rate of the gluing needles is 5~100 mm/s; the glue extruding rate is 0.2~4 mm³/s.

6. The method of edge sealing according to claim 1, wherein, a viscosity of the edge sealing glue is 200 mPa·s~400 mPa·s.

7. The method of edge sealing according to claim 1, wherein, the edge sealing glue is light solidifying glue or heat solidifying glue.

8. The method of edge sealing according to claim 7, wherein, a solidifying condition of the light solidifying glue is solidifying for 5~10 seconds under ultraviolet light of 100~500 cd; a solidifying condition of the heat solidifying glue is solidifying for 12~20 minutes at 160° C.~180° C.

9. The method of edge sealing according to claim 7, wherein, the light solidifying glue is UV light solidifying glue.

10. The method of edge sealing according to claim 7, wherein, the light solidifying glue is acrylic resin adhesive.

11. The method of edge sealing according to claim 7, wherein, the heat solidifying glue is acrylic adhesive.

* * * * *